(No Model.)

J. C. GALLAGHER.
GAS GENERATOR FOR LAMPS.

No. 585,642. Patented June 29, 1897.

Fig. 4. g' f'

Witnesses
A. S. Diven
H. H. Mills

Inventor
John C. Gallagher
by Eugene Diven
Attorney

THE NORRIS PETERS CO., PHOTO-LITHO., WASHINGTON, D. C.

UNITED STATES PATENT OFFICE.

JOHN C. GALLAGHER, OF ELMIRA, NEW YORK, ASSIGNOR OF TWO-THIRDS TO DAVID W. PAYNE AND M. C. ARNOT, OF SAME PLACE.

GAS-GENERATOR FOR LAMPS.

SPECIFICATION forming part of Letters Patent No. 585,642, dated June 29, 1897.

Application filed October 1, 1896. Serial No. 607,520. (No model.)

*To all whom it may concern:*

Be it known that I, JOHN C. GALLAGHER, a citizen of the United States, residing at Elmira, in the county of Chemung and State of New York, have invented certain new and useful Improvements in Gas-Generators for Lamps, &c., of which the following is a specification.

My invention relates to improvements in the apparatus for generating gas wherein a solid is decomposed by a liquid, and applies more particularly to generators of acetylene gas where it is intended to produce the gas at a low pressure and in such a limited quantity as is needed for immediate consumption only, the gas being taken directly from the generating-chamber and used at the same pressure under which it is held in the generating-chamber.

The objects of my improvements are, first, to provide means for feeding the liquid to the solid automatically under an approximately constant head in order to produce the gas steadily at the desired pressure; second, to provide means whereby the liquid-column will act as a safety-valve to allow for the escape of the gas without affecting the pressure at the burner when there is an overproduction in the generating-chamber, and, finally, to adapt such a generator for use in connection with bicycle-lamps, carriage-lamps, locomotive-headlights, &c., which are subject to heavy jolting, tilting, &c. I attain these objects by the mechanisms illustrated in the accompanying drawings, in which I have shown my invention as applied to a bicycle-lamp, and in which—

Figure 1:
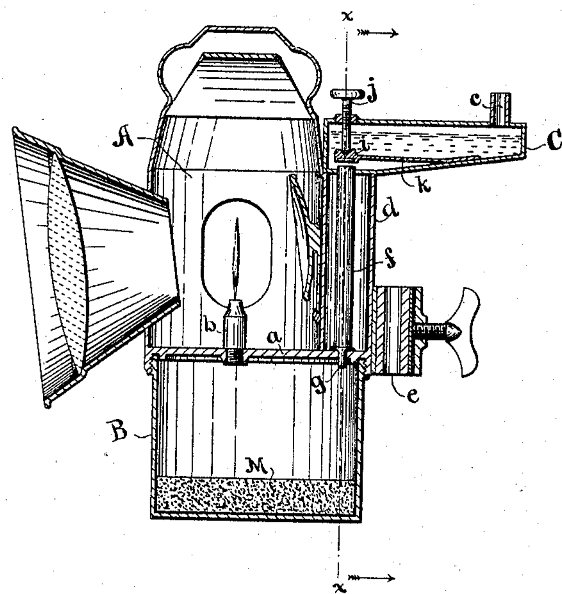
Figure 2:
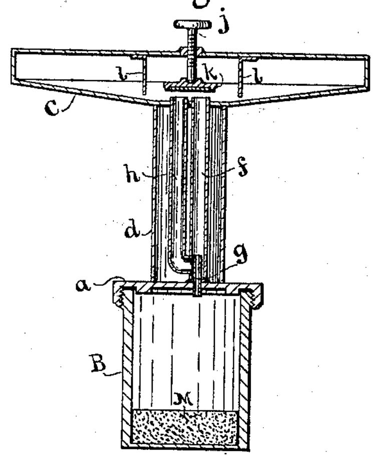

Figure 1 is a vertical section through the center of such a lamp; Fig. 2, a section on the line *x x*, Fig. 1, looking in the direction of the arrows; and Figs. 3 and 4, details showing a modification of the liquid-feed pipes.

Similar letters refer to similar parts throughout the several views.

A is the lamp proper, which is provided with the usual front glass or lens, reflector, side lights, air-vents, &c., and which rests upon the base-plate *a*.

B is a cylindrical vessel screwed or otherwise removably attached to the base-plate *a* with an air-tight joint. This vessel contains the solid to be decomposed, carbid of calcium in the present instance, and forms, when screwed into place, the generating-chamber. A shallow tank C is located above the generating-chamber at a sufficient distance to give the water contained therein the head of flow necessary to produce the gas at the desired pressure. A hollow column *d* at the rear of the lamp supports the tank, and to this column is fastened the clamp *e*, by which the lamp is attached to the lamp-bracket. A tube *f* extends from the bottom of the tank down to the base-plate *a* inside of and protected by the column *d*. A smaller tube or nozzle *g* passes from the bottom of tube *f* through the base-plate *a* and forms the final communication between the tank and generating-chamber. This nozzle rises a short distance inside of tube *f*, and there is at this point an annular space between the two. Into this space a second tube *h* from the tank opens for a purpose to be presently described.

A valve *i* is located above the openings of the tubes *f* and *h* in the tank and is operated by the thumb-screw *j*, the spring *k* acting to hold the valve open when the thumb-screw is raised. The tank is closed in on the top with the exception of the vent and filler opening *c*. Transverse partitions *l l*, provided with openings at the top and bottom for the circulation of air and water, are placed in the tank to prevent the entire body of water from being thrown from side to side when the lamp is tilted. The burner *b* communicates with the generating-chamber B and is suitably located in the lamp.

M represents a block of carbid of calcium.

The operation of the generator is as follows: When the valve *i* is opened, water flows down the two tubes *f* and *h* and runs slowly through the nozzle *g* into the generating-chamber, where it attacks the carbid and produces the acetylene gas. The gas-pressure in the generating-chamber rises until it is equal to that due to the head of the water column, when the flow of water is stopped and the further generation of gas ceases. As the gas is consumed at the burner the pressure in the generating-chamber will be lowered and water will be admitted, the several parts of the apparatus being designed relatively with the idea of generating the gas only so rapidly as it will be consumed at the burner and at the desired pressure. Owing, however, to the difficulty of gaging the consumption accurately and to the jolts and jars that the lamp is subject to, there will be at times more water admitted to the generating-chamber than is desirable, in which case there will be an overproduction of gas. As soon as the pressure rises above the normal the gas will rise through tube *f*, forcing the water out ahead of it, and escape through the vent *c*. This escape of gas immediately relieves the excess of pressure and the water in tube *h* stands ready to flow in around the nozzle *g*, filling tube *f* and immediately supplying water to the nozzle at the normal head, which prevents the pressure of gas in the generating-chamber from falling below the normal. Were only the one tube *f* used, it is evident that the escape of gas up the tube would decrease the head of the water-supply to such an extent that the pressure in the generating-chamber would fall very low before the water could run down the tube again. The object of the auxiliary water column in tube *h* will therefore be apparent. This arrangement of tubes makes a very efficient automatic feed-regulator and safety-valve. By its use the generation of gas at the designed pressure is quite constant and the gas burns with a steady flame even when the lamp is quite severely jolted. The escape of gas at the vent *c* is hardly noticeable and not at all objectionable in the open air, where such lamps are intended to be used. When it is desired to turn out the light, the valve *i* is closed, shutting off the water-supply and stopping the generation of gas, after which the flame at the burner will soon exhaust the small quantity of gas in the generating-chamber and go out. When the carbid becomes exhausted, the vessel B is removed, cleaned, and recharged and the tank C refilled with water.

Figure 3:
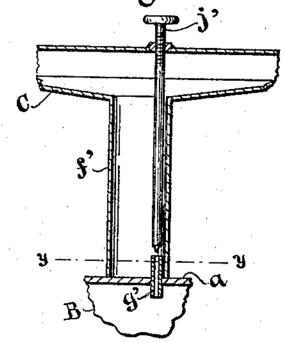

In Figs. 3 and 4 I have shown a modification in the construction of the water-columns, Fig. 4 being a section of Fig. 3 on the line *y y*. Here one large tube serves the purpose of the two tubes shown in Fig. 2, but the action of the water is just the same. Gas rising through the nozzle *g'* will pass up through the water in the right-hand side of the oblong tube *f'*, leaving a solid column of water in the left-hand side ready to fill the entire tube and supply water to the nozzle *g'* immediately the gas-pressure falls below the normal. The inside area of the tube *f'* must be large enough so that the escaping gas cannot fill across it and drive out all the water. This latter form is preferable in several ways to that first described, but the action of the first is perhaps more readily understood.

The tank C may be made of any desired shape. For instance, it might encircle the top of the lamp; but it must be shallow in order that the head of the water may remain as nearly as possible the same whether the tank is full or about to empty, and it must therefore be of comparatively large horizontal area in order to hold sufficient water.

While I have described my invention as especially applicable to lamps of the type specified, I do not wish to be understood as limiting it to such use, as it is evident that the automatic feeding device above described may be applied to other forms of this species of generators.

I am aware that it is not new to feed the water to the carbid through a column from an elevated tank, nor to have the gas force the water back up the column when there is an excess of pressure in the generating-chamber, and I do not therefore claim these things broadly.

What I claim as my invention, and desire to secure by Letters Patent, is—

1. In a gas-generating apparatus, the combination of a generating-chamber, a liquid-supply tank above the generating-chamber, and a two-part liquid-column between the two the parts of the column connecting with one another at its base substantially as described and for the purpose set forth.

2. In a gas-generating apparatus, the combination of a generating-chamber, a liquid-supply tank above the chamber, a two-part liquid-column between the tank and chamber, the parts of the column connecting with one another at its base, and a small tube or nozzle at the base of the column communicating between one part of the column and the chamber, substantially as described and for the purpose set forth.

3. In a gas-generating apparatus, the combination of a generating-chamber, a liquid-supply tank above the chamber, a liquid-column between the two through which gas is allowed to escape when the pressure exceeds the normal, and a second liquid-column opening into the foot of the first for the purpose set forth.

4. In a gas-generating apparatus, the combination of a generating-chamber, a liquid-supply tank above the chamber, transverse partitions in the tank provided with openings at top and bottom for the purpose described, and a liquid-column between tank and chamber.

5. In a portable lamp, the lamp proper, a gas-generating chamber removably attached thereto, a burner in the lamp connected with the generating-chamber, a shallow liquid-supply tank at a suitable distance above said chamber to give a head of flow sufficient to produce the gas at the desired pressure, a two-part liquid-column between the tank and chamber, a small tube or nozzle communicating between the column and chamber, a valve to control the discharge of liquid from the tank, and a vent in the top of the tank, all combined substantially as described and for the purpose set forth.

In testimony whereof I have affixed my signature in presence of two witnesses.

JOHN C. GALLAGHER.

Witnesses:

HOLLIS H. MILLS,
EUGENE DIVEN.